United States Patent [19]

Koerner et al.

[11] Patent Number: 5,004,559
[45] Date of Patent: Apr. 2, 1991

[54] POLYOXYALKYLENE-POLYSILOXANE BLOCK COPOLYMERS AS DEMULSIFIERS FOR WATER-CONTAINING OIL

[75] Inventors: Götz Koerner; Dietmar Schaefer, both of Essen, Fed. Rep. of Germany

[73] Assignee: Th. Goldschmidt AG, Essen, Fed. Rep. of Germany

[21] Appl. No.: 271,995

[22] Filed: Nov. 16, 1988

Related U.S. Application Data

[62] Division of Ser. No. 69,296, Jul. 2, 1987, abandoned.

[30] Foreign Application Priority Data

Jul. 4, 1986 [DE] Fed. Rep. of Germany ....... 3622571

[51] Int. Cl.$^5$ .............................................. B01D 17/05
[52] U.S. Cl. .................... 252/345; 252/358; 208/188; 210/708
[58] Field of Search ...................... 252/318, 358, 345; 210/708; 208/188

[56] References Cited

U.S. PATENT DOCUMENTS

| | | | |
|---|---|---|---|
| 4,183,820 | 1/1980 | Theile et al. | 252/358 X |
| 4,514,319 | 4/1985 | Kulkarni et al. | 252/358 X |
| 4,596,653 | 6/1986 | Graham et al. | 210/708 X |
| 4,711,714 | 12/1987 | Callaghan et al. | 252/49.6 X |
| 4,854,938 | 8/1989 | Easton et al. | 208/188 X |

FOREIGN PATENT DOCUMENTS

| | | |
|---|---|---|
| 0059037 | 9/1982 | European Pat. Off. . |
| 0125779 | 11/1984 | European Pat. Off. . |
| 0141585 | 5/1985 | European Pat. Off. . |
| 0167361 | 1/1986 | European Pat. Off. . |
| 1194111 | 6/1970 | United Kingdom . |
| 1206698 | 9/1970 | United Kingdom . |

*Primary Examiner*—Richard D. Lovering
*Assistant Examiner*—Daniel S. Metzmaier
*Attorney, Agent, or Firm*—Toren, McGeady & Associates

[57] ABSTRACT

To demulsify water-containing crude oil, selected polyoxyalkylene-polysiloxane block copolymers are described.

The demulsifiers are used in amounts of less than 200 ppm based on the crude oil.

3 Claims, No Drawings

POLYOXYALKYLENE-POLYSILOXANE BLOCK COPOLYMERS AS DEMULSIFIERS FOR WATER-CONTAINING OIL

This is a division of application Ser. No. 069,296 filed July 2, 1987 now abandoned.

FIELD OF INVENTION

The invention is directed to the processing of crude oil and more particularly, to the demulsification of water-in-oil crude oil emulsions.

BACKGROUND INFORMATION AND PRIOR ART

A large portion of crude oil upon production, contains greater or lesser amounts of salt water in emulsified form. Such emulsions, which occur predominantly as water-in-oil emulsions, must be separated into their phases, since the salt water contained in the emulsion interferes with the further processing of the crude oil, especially with the transporting and distilling of such oil.

The separation of such crude oil emulsions is accomplished by allowing them to stand, by subjecting them to a heat treatment or a centrifuging process, by applying electric fields and by adding demulsifiers.

The crude oil emulsions contained in produced crude oil generally are too stable to be broken by sedimentation, filtration, centrifugation or heating alone. On the other hand, the demulsifiers affect the interfaces of the crude oil emulsions directly and in some cases, bring about a separation of the emulsion even in moderate concentrations.

A large number of demulsifiers has already been proposed. One of the reasons for this, and not the least important, is the fact that different crude oils have different compositions and demulsifiers, which are suitable for breaking emulsions of crude oil originating from one place, may be unsuitable for crude oil emulsions from other extraction sites. The known demulsifiers therefore act to a greater or lesser extent specifically on the individual crude oils.

As demulsifiers, alkyl sulfates and alkyl aryl sulfonates, as well as petroleum sulfonates in the form of the amine salts have already been proposed. Moreover, addition products of ethylene oxide on suitable compounds with active hydrogen atoms, such as alkylphenols, castor oil fatty acids, fatty alcohol, alkylphenol-formaldehyde resins, have been suggested. Appropriate information may be found, for example, in the book "Oberflachenaktive Anlagerungsprodukte des Ethylenoxyds" (Surface Active Addition Products of Ethylene Oxide) by N. Schonfeld, Wissenschaftliche Verlagsgesellschaft mbH. Stuttgart. 1959. page 295.

From the German Patent 1,937,130, the use of polyoxyalkylene-polysiloxane block copolymers is known. These polyoxylakylene-polysiloxane block copolymers have polyoxyalkylene blocks with a molecular weight of 500 to 4,000 and comprise polyoxyethylene and polyoxypropylene blocks in a weight ratio of 40:60 to 100:0. the polysiloxane blocks containing 3 to 50 silicon atoms per block. These block copolymers are liquid to waxy substances, which can be dispersed or dissolved in water. They are therefore added to the water-containing crude oil either as such or in the form of concentrated solutions or dispersions.

Further selected polyoxyalkylene-polysiloxane block copolymers are described in numerous published patent applications or patents. For example, in the published European Patent Application 0,141,585, a process is described for demulsifying oil with the help of polyoxyalkyl-ene-polysioxane block copolymers, the block copolymers corresponding to the general formula

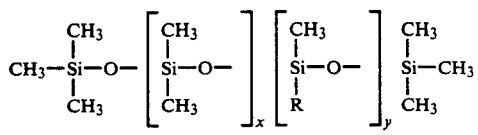

In this formula, x and y are numbers from 1 to 200 and the sum of x+y should not exceed 250. R is a copolymeric group, randomly distributed, which corresponds to the formula

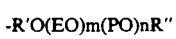

wherein R' is an alkylene group with 3 to 10 carbon atoms. EO is an ethylene oxide group. PO is a propylene oxide group. R" is a hydrogen atom or a hydrocarbon group with not more than 7 carbon atoms. m and n are numbers from 2 to 100 or 2 to 80 and the sum of m+n does not exceed 100.

OBJECTS OF THE INVENTION

It is the primary object of the invention to provide crude oil demulsifiers based on polyoxyalkylene-polysiloxane block copolymers, which are superior in effectiveness to the known block copolymers used as demlsifiers. As a measure of the effectiveness, the completeness of the separation of the water contained in the crude oil on the one hand and the rate of the separation of the water from the crude oil on the other are evaluated. The separated water should, in turn, contain only slight amounts and especially less than 50 ppm of emulsified crude oil. Furthermore, the boundary layer between the water and the crude oil should be as sharp as possible.

Generally, it is an object of the invention to improve on the art of removing water from crude oils.

SUMMARY OF INVENTION

Surprisingly, it was discovered that polyoxyalkylene-polysiloxane mixed block copolymers have a particularly high demulsifying effectiveness, if they comply with certain selection criteria.

The polyoxyalkylene-polysioxane mixed block polymers to be used pursuant to the invention have the general formula

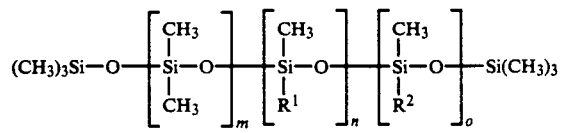

wherein
$R^1$ is alkyl with 6 to 28 carbon atoms:
$R^2$ is a polyether of the general formula

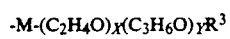

wherein

M is an alkyleneoxy group with up to 4 carbon atoms or an oxygen atom, $R^3$ is hydrogen, alkyl with 1 to 4 carbon atoms, acyloxy or trimethylsilyl, x and y are whole numbers, which are selected so that the molecular weight of the $R^2$ group is not greater than 1,000. the ratio by weight of oxyethylene to oxypropylene groups being 100:0 to 50:50, m = 0 to 20.
n = 10 to 50.
o = 10 to 50.

The demulsifying mixed block polymers are used in amounts of less than 200 ppm in the water-containing crude oil. Amounts as low as 2 ppm show significant results.

The demulsifiers are used in the form of compositions containing 1–99 percent by weight of demulsifier and 99–1 percent by weight of solvent. Preferred concentrations are 2–70 percent by weight of demulsifier and the remainder solvent. Excellent results are achieved with compositions containing 5–60 percent by weight of demulsifier, with the remainder being solvent.

Suitable solvents are aromatic hydrocarbons such as benzene, toluene. xylene or mixtures thereof, as well as liquid, aliphatic monoalcohols, which may be linear or branched. Monoalcohols having 3–12 carbon atoms are particularly preferred. Propanol, isopropanol, butanol, isobutanol, pentanol, isopentanol and hexanol are thus suitable solvents. The preferred amount of the composition to be added to the crude oil emulsion is such that 10–200 ppm of demulsifier are present in the crude oil.

As stated, $R^1$ is an alkyl group with 6 to 28 carbon atoms. The alkyl group preferably is linear. If alkyl groups with fewer than 6 carbon atoms are selected, the demulsifying effect is clearly decreased. If $R^1$ has more than 28 carbon atoms, the mixed block polymers become waxy and solid, their demulsifying effect decreases clearly and considerable more time is required to separate the water. It is especially preferred if $R^1$ has 8 to 18 carbon atoms.

$R^2$ is a polyether group of the general formula

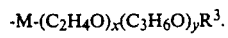

$-M-(C_2H_4O)_x(C_3H_6O)_yR^3$.

Depending on the meaning of M. the polyoxyalkylene blocks are thus linked over an SiC- or an SiOC bridge with the polysiloxane block. Block copolymers in which M is an alkyleneoxy group with to 4 carbon atoms, are Preferred. Especially preferred are alkylene groups with 3 or 4 carbon atoms.

$R^3$ is hydrogen, alkyl with 1 to 4 carbon atoms, acyloxy, especially acetoxy, or trimethylsilyl. Preferably, $R^3$ is hydrogen. x and y are whole numbers, which are selected so that the molecular weight of $R^2$ is not greater than 1,000. A molecular weight of 200 to 800 and especially of 200 to 400 is preferred. The weight ratio of oxyethylene to oxypropylene should be 100:0 to 50:50. An $R^2$, which contains exclusively of oxyethylene groups, is preferred.

The subscript m has a value of 0 to 20 and preferably of 0 to 5. The subscript n has a value of 10 to 50 and preferably of 15 to 40. The subscript o has a value of 10 to 50 and preferably of 10 to 25. compounds. in which the subscript o is not greater than n are preferred. If the numerical use of the subscript n corresponds to that of the subscript o, the molecular weight of the Polyether groups should correspond approximately to that of $R^1$ especially for heavy oils.

If oxyethylene and oxypropylene groups are both present in the molecule of the block copolymer, these groups may be present in statistical distribution as well as separately in block.

The polysiloxanes, on which the mixed block polymers are based, usually are polysiloxane mixtures, especially equilibrated polysiloxane mixtures. The different units, from which the polysiloxane is built up, generally are distributed statistically. The formulas of the block copolymers, which are to be used pursuant to the invention, therefore are to be understood as general formulas of the average molecule.

Examples of block copolymers, which are to be used pursuant to the invention are

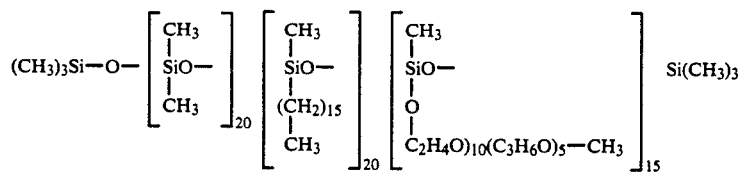

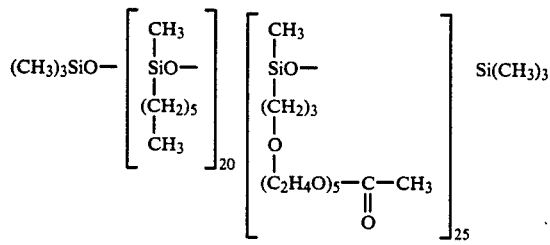

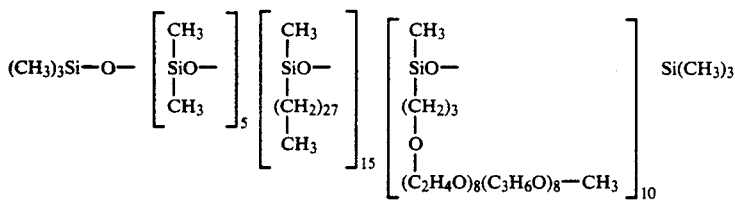

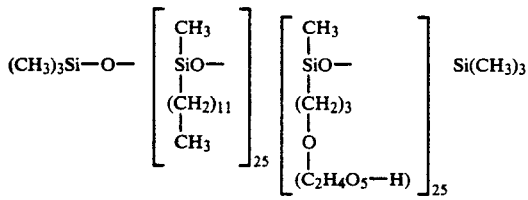

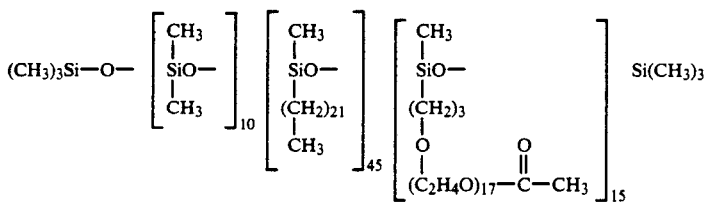

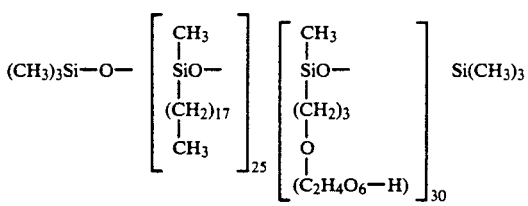

The block copolymers, which are to be used in accordance with the invention, are synthesized by methods known from the art. For example, the synthesis of block copolymers, in which the polyoxyalkylene blocks are linked over an SiC bond to the siloxane block, is described in the U.S. Pat. Nos. 3,234,252, 4,047,958, 3,427,271 and 2,846,458. The synthesis preferably is carried out by adding an o-olefin with the desired number of carbon atoms of the R¹ group and a polyoxyalkylene ether of an olefinically unsaturated alcohol to a hydrogensiloxane, the addition being carried out in the presence of a platinum-containing catalyst.

The block copolymers, which are to be used in accordance with the invention and in which the polyoxyalkylene block is linked over an SiOC bridge to the polysiloxane block, are also synthesized by known methods by reacting that appropriate hydrogen siloxanes with the appropriate polyoxyalkylene monoalcohols, hydrogen being split off.

The block copolymers, which are to be used in accordance with the invention, are effective when added in amounts of less than 200 ppm to the crude oil. They exhibit the desired combination of properties, especially a rapid separation of the water.

It is also possible to employ the block copolymers, which are to be used pursuant to the invention, together with other known demulsifiers. For example, good results are achieved if the block copolymers, which are to be used pursuant to the invention, are employed together with alkylene oxide addition products of alkylphenol-formaldehyde resins. Other demulsifiers, with which the selected block copolymers may be combined are, for example, alkoxylated fatty acids, alkoxylated fatty alcohols, alkoxylated alkylphenols, alkoxylated polyols, alkyl sulfates and alkyl aryl sulfonates.

The following examples show that the demulsifying properties of the block copolymers, which are to be used pursuant to the invention, are superior to those of polyoxyalkylene-polysiloxane block copolymers known from the art, the examples being given by way of illustration and not by way of limitation.

The demulsifiers, which are to be used in accordance with the invention, have the following average general formula:

Product A:

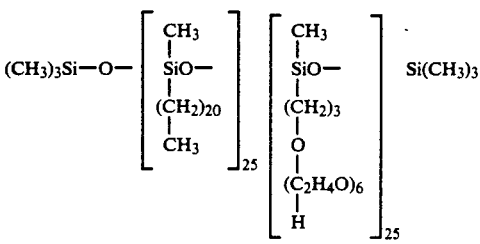

Product B:

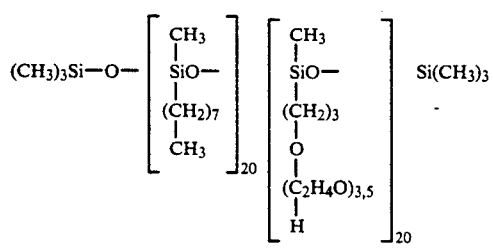
Product C:
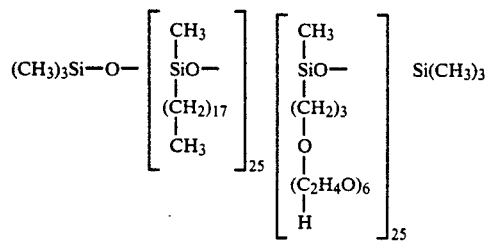
Product D:
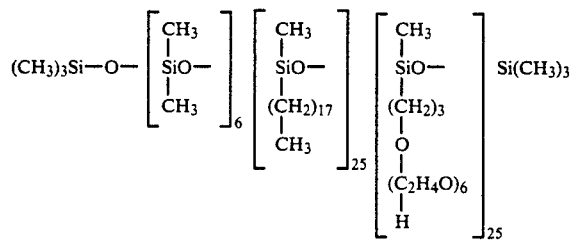
Product E:
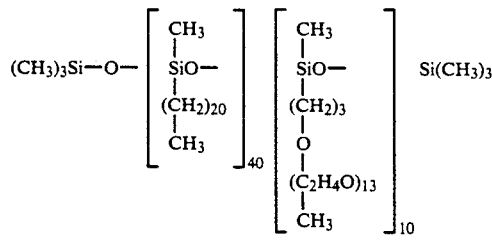
Product K:
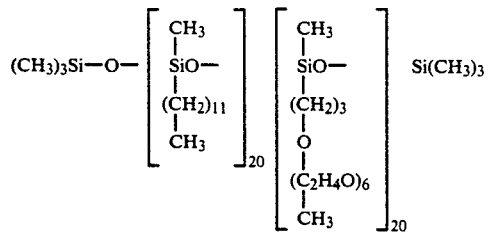
Product L:
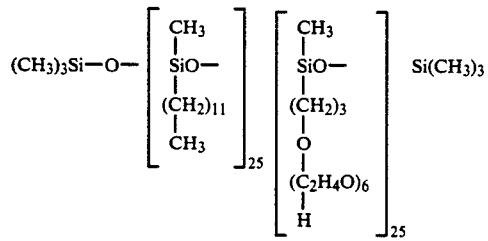
Product M:
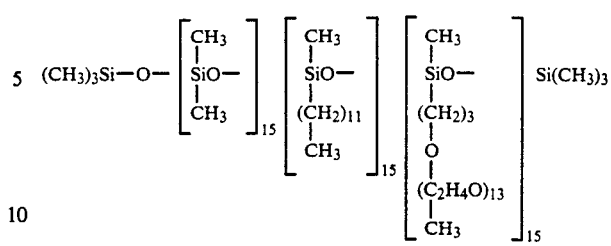
Product N:
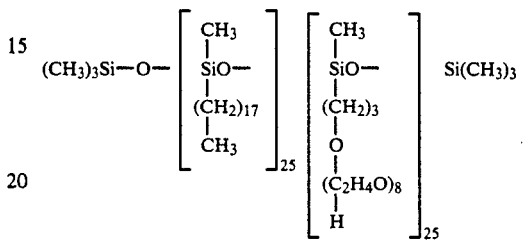
Product O:
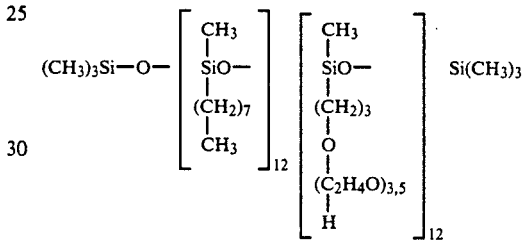
For comparison, the products referred to as demulsifiers 1, 3 and 5 in the European Offenlegungsschrift 0,141,585. page 7. were used:
Product F: (Demulsifier 1)
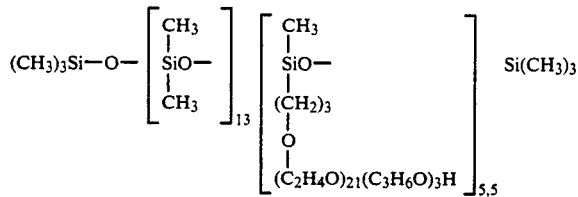
Product G: (Demulsifier 3)
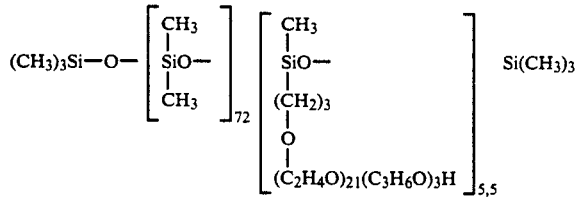
Product H: (Demulsifier 5)
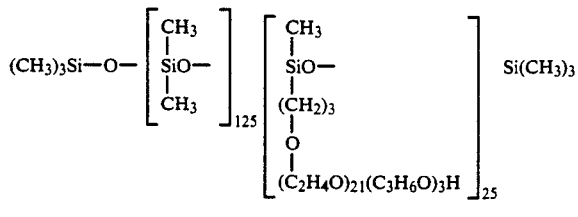

EXAMPLE 1

A Venezuelan heavy oil, which is regarded as particularly difficult to demulsify, especially if, as in this example, it has been aged in air. is used as crude oil. The crude oil emulsion contains 40% by volume of water.

To homogenize it, a crude oil sample is heated to 70° C. and mixed for 3 minutes with an impeller stirrer at 2.000 R.P.M. The sample is filled into calibrated flasks, mixed with 0.15% of a 5% demulsifier solution in toluene (0.0075%=75 ppm of active material), shaken 200 times and placed in water bath heated to 80° C. The amount of water settling out is read after 3, 6 and 24 hours. The results are listed in Table 1.

TABLE 1

| Demulsifier | Amount Used (ppm) | Amount of Water Separated (% by volume) After | | |
|---|---|---|---|---|
| | | 3 hours | 6 hours | 24 hours |
| of the invention | | | | |
| A | 75 | 3 | 10 | 18 |
| B | 75 | 7 | 10 | 15 |
| C | 75 | 4 | 20 | 28 |
| D | 75 | 4 | 5 | 20 |
| E | 75 | 5 | 10 | 18 |
| not of the invention | | | | |
| F | 75 | 2 | 5 | 8 |
| G | 75 | 0 | 0 | trace |
| H | 75 | 0 | 0 | trace |
| untreated emulsion | 0 | 0 | 0 | 0 |

EXAMPLE 2

A North Sea oil (light oil) is used as crude oil. A 22% water-in-oil emulsion is prepared as follows:

The oil is heated to 80° C., cooled within 4 to 5 minutes to 40° C., mixed with 22% by volume of formation water and emulsified with an Ultraturrax for 3 minutes at about 15.000 R.P.M.

The sample is filled into calibrated flasks, mixed with 0.03% of a 5% demulsifier solution in toluene (0.0015%=15 ppm of active ingredient), shaken 200 times and placed in a water bath heated to 40° C. The amount of water, which has separated, is read after 15, 30, 45 and 60 minutes and recorded. The results are summarized in Table 2.

TABLE 2

| Demulsifier | Amount Used (ppm) | Amount of Water Separated (% by volume) After | | | |
|---|---|---|---|---|---|
| | | 15 min | 30 min | 45 min | 60 min |
| of the invention | | | | | |
| K | 15 | 13 | 17 | 20 | 20 |
| L | 15 | 12 | 17 | 18 | 20 |
| M | 15 | trace | 10 | 15 | 15 |
| N | 15 | trace | 10 | 15 | 15 |
| not of the invention | | | | | |
| F | 15 | trace | trace | 8 | 10 |
| G | 15 | 0 | 0 | 0 | 0 |
| H | 15 | 0 | 0 | 0 | 0 |
| untreated emulsion | 0 | 0 | 0 | 0 | 0 |

EXAMPLE 3

A North German crude oil (medium heavy oil) is used. Since the emulsion in this example has aged, the free water, which has already separated, is removed and the remaining emulsion (28% water ) is homogenized at 40° C. for 3 minutes with an impeller stirrer at 2.000 R.P.M.

The oil sample is filled into calibrated flasks, mixed with 0.08% of a 5% demulsifier solution in toluene (0.004%=40 ppm of active substance), shaken 200 times and placed in a water bath heated to 50° C. The amount of water, which has separated after 45, 90 and 180 minutes. is read and recorded. The results are summarized in Table 3.

TABLE 3

| Demulsifier | Amount Used (ppm) | Amount of Water Separated (% by volume) After | | |
|---|---|---|---|---|
| | | 45 min | 90 min | 180 min |
| of the invention | | | | |
| K | 40 | 15 | 18 | 20 |
| L | 40 | 20 | 22 | 25 |
| B | 40 | 20 | 21 | 21 |
| O | 40 | 18 | 21 | 22 |
| not of the invention | | | | |
| F | 40 | trace | 5 | 10 |
| G | 40 | trace | trace | trace |
| H | 40 | trace | trace | trace |
| untreated emulsion | 0 | 0 | 0 | 0 |

EXAMPLE 4

The inventive polyalkylene-polyoxyalkylene-polysiloxanes A. B and C are mixed with a conventional commercial ethoxylated nonylphenol-formaldehyde resin (approx. 40% EO) in the weight ratio of 1:1. Oil and sample prepared as in Example 1, Dosage: 60 ppm. The results are summarized in Table 4.

TABLE 4

| Inventive Demulsifier Mixed with a Nonyl-Phenol-Formaldehyde Resin | Amount Used (ppm) | Amount of Water Separated (% by volume) After | | |
|---|---|---|---|---|
| | | 3 hours | 6 hours | 24 hours |
| A | 60 | 2 | 3 | 17 |
| B | 60 | 2 | 2 | 18 |
| C | 60 | 11 | 18 | 24 |
| untreated emulsion | 0 | 0 | 0 | 0 |

We claim:

1. A method of demulsifying water-containing crude oil emulsions, which comprises admixing the water-containing crude oil with an effective amount to demulsify of a polyoxyalkylene-polysiloxane mixed block polymer of the general formula

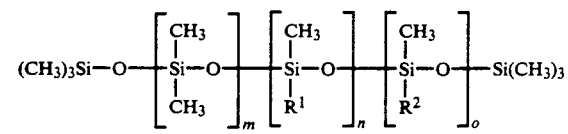

wherein
R$^1$ is alkyl with 6 to 28 carbon atoms;
R$^2$ is a polyether of the general formula

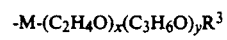

wherein M is an alkyleneoxy group with up to 4 carbon atoms or an oxygen atom, R$^3$ is hydrogen, alkyl with 1 to 4 carbon atoms, acyloxy or trimethylsilyl, x and y are whole numbers, which are selected so that the molecular weight of the R$^2$ group is not greater than 1,000, the ratio by weight of oxyethylene to oxypropylene groups being 100:0 to 50:50, m=0 to 20.
n=10 to 50 and
o=10 to 50.

2. The method of claim 1, wherein said effective amount is less than 200 ppm.

3. The method of claim 1, wherein said effective amount is between about 10-200 ppm.

* * * * *